(No Model.)

A. BEALS.
HAMMOCK SPREADER.

No. 375,793. Patented Jan. 3, 1888.

Witnesses
C. F. Daniels
W. H. Preston

Inventor
Augustus Beals.
by Singleton & Piper attys.

UNITED STATES PATENT OFFICE.

AUGUSTUS BEALS, OF NORTH WEYMOUTH, MASSACHUSETTS.

HAMMOCK-SPREADER.

SPECIFICATION forming part of Letters Patent No. 375,793, dated January 3, 1888.

Application filed November 14, 1887. Serial No. 255,085. (No model.)

*To all whom it may concern:*

Be it known that I, AUGUSTUS BEALS, a citizen of the United States, residing at North Weymouth, in the county of Norfolk and State of Massachusetts, have invented certain new and useful Improvements in Hammock-Spreaders; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1:
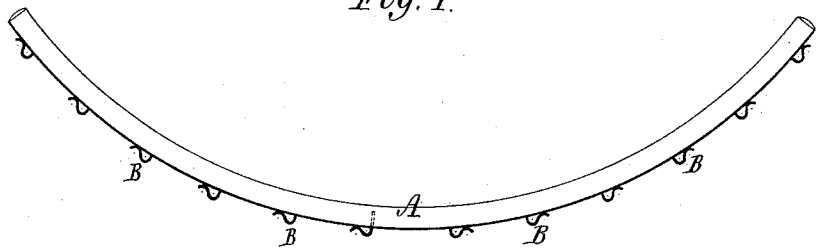
Figure 2:
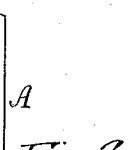
Figure 3:
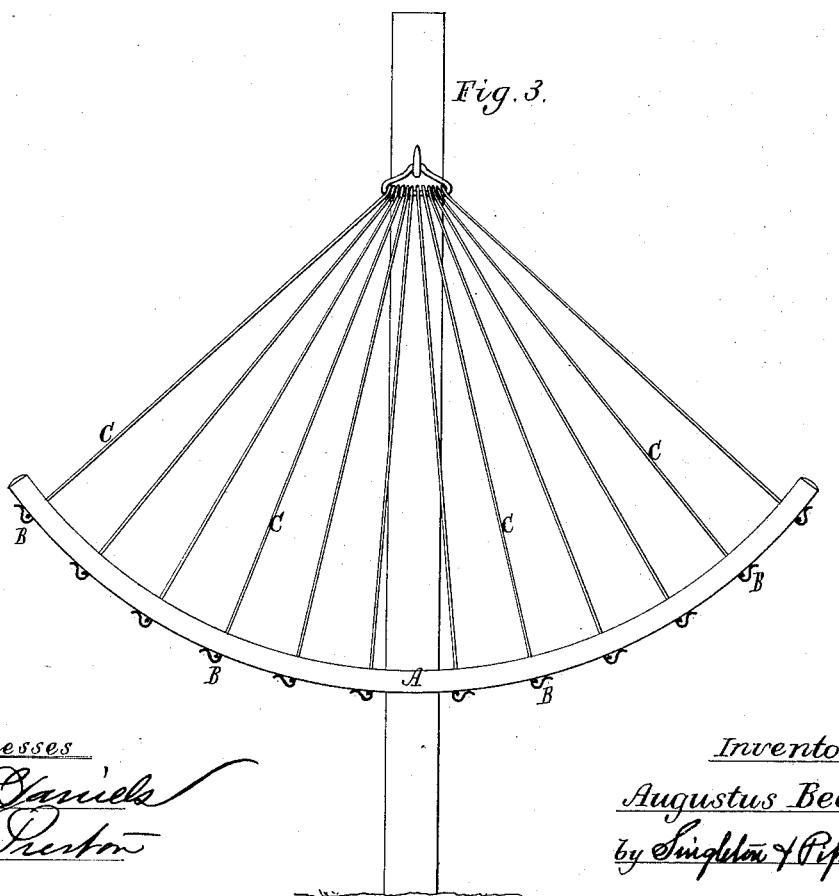

Figure 1 is a side view, and Fig. 2 a transverse section, of a hammock-spreader provided with my invention. Fig. 3 is a transverse section of a hammock having my spreader applied thereto.

In the drawings, A denotes the spreader, and B B the series of spring-hooks, and C C C, &c., the cords of the hammock, which are represented as in engagement with the said spring-hooks.

In carrying out my invention I form the spreader circular in transverse section and curved longitudinally, as shown, and to the lengthwise-convex surface of the spreader I secure a series of spring-hooks, which are screwed or driven into said spreader with the points or ends of their hooks extending in opposite directions from the center of the spreader or toward each end of it; or, in other words, the points of one half of the hooks extend toward one end of the spreader and the points of the other half toward the other end of it, as shown. The hooks near their points are formed to act as springs and touch or nearly touch the surface of the spreader, as shown, so that when the cords of the hammock are passed between the spreader and the springs of the hooks the point of each hook will be borne away from the spreader sufficiently to allow the cord to pass into the hook, and will then spring back, so as to retain the cord in the hook and prevent the cord from becoming easily disengaged from it.

The advantage my hammock spreader has over others in use is that it is easily engaged with a hammock, and when engaged therewith will keep in place while in use and while a person is getting into or out of the hammock, there being no liability of the cords becoming disengaged from the hooks unless removed by the hands of a person.

I am aware that there has been patented a hammock-spreader having hooks, and also a flat spreader having on top a wire made with coils in pairs, and the cords are placed between the coils of each pair.

What, therefore, I claim as my invention, and desire to secure by Letters Patent, is—

1. As a new article of manufacture, a hammock-spreader circular in transverse section and curved longitudinally, and provided on its lengthwise-convex surface with a series of hooks having the spring-points which touch or nearly touch the spreader, and are arranged substantially as shown, and for the purpose specified.

2. A hammock-spreader circular in transverse section and curved longitudinally, and provided on its lengthwise-convex surface with a series of hooks having the spring-points which touch or nearly touch the spreader, and are arranged as shown, in combination with a hammock, as set forth.

In testimony whereof I affix my signature in presence of two witnesses.

AUGUSTUS BEALS.

Witnesses:
S. N. PIPER,
C. F. DANIELS.